United States Patent
Karas

(10) Patent No.: US 11,810,471 B2
(45) Date of Patent: Nov. 7, 2023

(54) COMPUTER IMPLEMENTED METHOD AND APPARATUS FOR RECOGNITION OF SPEECH PATTERNS AND FEEDBACK

(71) Applicant: Speech Engineering Limited, London (GB)

(72) Inventor: David Matthew Karas, London (GB)

(73) Assignee: SPEECH ENGINEERING LIMITED, London (GB)

( * ) Notice: Subject to any disclaimer, the term of this patent is extended or adjusted under 35 U.S.C. 154(b) by 0 days.

(21) Appl. No.: 17/054,701

(22) PCT Filed: May 13, 2019

(86) PCT No.: PCT/GB2019/051299
§ 371 (c)(1),
(2) Date: Nov. 11, 2020

(87) PCT Pub. No.: WO2019/215459
PCT Pub. Date: Nov. 14, 2019

(65) Prior Publication Data
US 2021/0082311 A1  Mar. 18, 2021

(30) Foreign Application Priority Data

May 11, 2018  (GB) ..................... 1807663

(51) Int. Cl.
*G09B 19/04* (2006.01)
*G09B 19/06* (2006.01)
(Continued)

(52) U.S. Cl.
CPC ............. *G09B 19/04* (2013.01); *G09B 19/06* (2013.01); *G10L 15/02* (2013.01); *G10L 15/187* (2013.01);
(Continued)

(58) Field of Classification Search
CPC .......... G09B 19/04; G09B 19/06; G09B 5/02; G09B 5/04; G09B 5/065; G10L 15/02;
(Continued)

(56) References Cited

U.S. PATENT DOCUMENTS 8,442,821 B1 *  5/2013  Vanhoucke ............. G10L 15/14
704/232
8,768,704 B1 *  7/2014  Fructuoso ............. G06F 40/284
704/277
(Continued)

FOREIGN PATENT DOCUMENTS

EP           1947643          7/2008

OTHER PUBLICATIONS

International Search Report in PCT/GB2019/051299 dated Jul. 22, 2019.
Written Opinion in PCT/GB2019/051299 dated Jul. 22, 2019.

*Primary Examiner* — Malina D. Blaise
(74) *Attorney, Agent, or Firm* — Thomas Horstemeyer, LLP

(57) ABSTRACT

A computer system analyses audio data representing a user speaking words from a body of text and identifies occasions where the user mispronounces an expected phoneme. Mispronunciation of the expected phoneme is identified by comparison with a phonetic sequence corresponding to the text, based on a predetermined or user-selected language model. The system requires the user to read continuously for a period of time, so that the user cannot hide any tendency they have to pronounce the words of the text either incorrectly or differently to the expected phonemes from the language model. The system operates on the basis of comparing the similarity of the spoken sounds of the user with the expected phonemes for the body of text, and it is not necessary to convert the user's speech to text. As the computer system need only work with the similarity scores (Continued)

and the sequence of expected phonemes, it can be implemented in a computationally efficient manner.

19 Claims, 7 Drawing Sheets

(51) Int. Cl.
| | | |
|---|---|---|
| *G10L 15/02* | (2006.01) | |
| *G10L 15/187* | (2013.01) | |
| *G10L 15/22* | (2006.01) | |
| *G09B 5/02* | (2006.01) | |
| *G09B 5/04* | (2006.01) | |
| *G09B 5/06* | (2006.01) | |

(52) U.S. Cl.
CPC ............... *G10L 15/22* (2013.01); *G09B 5/02* (2013.01); *G09B 5/04* (2013.01); *G09B 5/065* (2013.01); *G10L 2015/025* (2013.01); *G10L 2015/225* (2013.01)

(58) Field of Classification Search
CPC . G10L 15/187; G10L 15/22; G10L 2015/025; G10L 2015/225
See application file for complete search history.

(56) References Cited

U.S. PATENT DOCUMENTS

| | | | |
|---|---|---|---|
| 9,240,184 B1* | 1/2016 | Lin | G10L 15/142 |
| 11,704,436 B2* | 7/2023 | Feuz | G06F 40/279 |
| | | | 726/26 |
| 2004/0166480 A1* | 8/2004 | Wen | G09B 5/06 |
| | | | 434/156 |
| 2014/0278421 A1* | 9/2014 | Komissarchik | G09B 19/06 |
| | | | 704/251 |
| 2018/0068662 A1* | 3/2018 | Schlippe | G10L 25/90 |
| 2018/0268728 A1* | 9/2018 | Burdis | G09B 7/04 |
| 2018/0336882 A1* | 11/2018 | Reber | G06N 3/042 |
| 2019/0130894 A1* | 5/2019 | Jin | G10L 21/00 |
| 2020/0074985 A1* | 3/2020 | Clark | G10L 25/24 |
| 2022/0301543 A1* | 9/2022 | Elias | G06N 3/045 |

\* cited by examiner

COMPUTER IMPLEMENTED METHOD AND APPARATUS FOR RECOGNITION OF SPEECH PATTERNS AND FEEDBACK

CROSS-REFERENCE TO RELATED APPLICATION

This application is the 35 U.S.C. § 371 national stage application of PCT Application No. PCT/GB2019/051299, entitled "COMPUTER IMPLEMENTED METHOD AND APPARATUS FOR RECOGNITION OF SPEECH PATTERNS AND FEEDBACK" and filed on May 13, 2019, which claims priority to and the benefit of GB Patent Application No. 1807663.8, entitled "COMPUTER IMPLEMENTED METHOD AND APPARATUS FOR RECOGNITION OF SPEECH PATTERNS AND FEEDBACK" and filed on May 11, 2018, the content of each of which is incorporated by reference as if set forth herein in their entireties.

TECHNICAL FIELD

The invention relates to a computer implemented method and apparatus for recognition of speech patterns, in particular for speech training and speech analysis.

BACKGROUND

Speech analysis systems use language models that have been trained on large amounts of training data. The training data for the language model includes sample audio signals representing human speech, spoken in the language for which the model is to be trained, and text to which the speech corresponds.

A language model is a collection of 'phonemes' representing the spoken sounds of a particular language, including any accents, in relation to the written representation of those sounds. Using a phonetic dictionary and rules of pronunciation for the language, a training computer system breaks a piece of text up into a 'phonetic sequence' of phonemes. Phonemes are the smallest semantic components of words representing sounds (or 'phones') a speaker makes when speaking the words of the text. This means that parts of an audio signal corresponding to the text will map onto particular phonemes in the phonetic sequence. By comparing an audio signal representing the speech to the phonetic sequence, the system is able to determine signal profiles corresponding to particular phonemes. By repeating this for large amounts of training data, the system is eventually able to determine signal profiles for each phoneme/sound that exists within the language.

As well as different languages, language models can be trained on different regional variations of languages, for example accents. People speaking the same language but with different accents will pronounce at least some phonemes differently (different 'allophones' of the same phones), so language models trained on different accents will have different signal profiles for certain phonemes. Allophones are phonetically distinct variants of a phoneme. They have distinct sounds when spoken but, if substituted, do not change the meaning of a word or phrase.

Speech Recognition System

One example of a speech analysis system is a speech recognition system. Speech recognition systems use trained language models to convert an input audio signal representing human speech into text. A typical speech recognition system first divides the received audio signal into short time frames. For each time frame, and for each sound/phoneme that is defined in the trained language model, the system uses signal processing techniques to compare the audio signal in the time frame to the signal profile in the language model, and outputs a score representing how similar the input signal in the time frame is to the signal profile for the phoneme. The speech recognition system chooses the phoneme with the highest score, or at least the score that indicates the greatest degree of similarity. In this way, the speech recognition system generates text from input audio.

Another example of a speech analysis system is a speech training system. Speech training systems use trained language models to analyse input audio representing human speech, identify mistakes in pronunciation, and provide feedback to users based on the identified mistakes. This helps users improve their spoke language skills, for example by improving a non-native speaker's intelligibility to native speakers of a language, or reducing the strength of an accent with which a user speaks.

Conventionally, speech training systems work by asking user to say a predefined word or short sentence. Having received an audio signal representing the speech, the system maps short segments of the audio signal to the phonemes of a phonetic sequence representing the predefined word or sentence. Then, for each phoneme and segment, the system uses signal processing techniques to compare the expected signal profile as defined in the language model for the phoneme to the received signal, and outputs a score representing the similarity. Where the received signal profile does not closely match the expected signal profile, the user may be making pronunciation mistakes, and the speech training system may alert the user to the mistakes and provide feedback.

The inventors of the present application have appreciated problems with conventional speech training systems which rely on users repeating short words and phrases to identify mistakes and provide feedback.

For example, while conventional systems may be able to identify the presence of mistakes, they are limited in their ability to analyse and categorize the mistakes, which limits the ability of the system to provide useful feedback and relevant recommendations to users.

Further, the inventors have appreciated that users may be able to perform beyond their actual capabilities when repeating short words or phrases, as short words and phrases allow users to focus on their speech in a way they cannot during, for example, normal conversation. Existing speech training systems may therefore not be able to identify mistakes that users make during normal speech, as they may not appear when the user repeats a short word or phrase.

Further still, the inventors have appreciated that in existing speech training systems, the accuracy with which mistakes are identified and the quality of the feedback provided may be negatively affected by failures that are inherent in speech recognition systems. For example, limitations in signal processing techniques may mean that there will always be some occasional instances where the speech training systems misses a mistake (a 'false negative'), or identifies a mistake where in fact there is no mistake (a 'false positive'). Since the conventional systems are based on the analysis of short utterances from the user, where there may only be a few opportunities to identify mistakes, these inherent failures can mean that mistakes that are in fact habitual mistakes which have a significant impact on an individual's intelligibility are missed altogether due to a false negative. Similarly, a false positive can mean that users are presented with inaccurate feedback, indicating they need to improve in a particular area even though no improvement is necessary.

Embodiments described herein provide improved speech training systems which are better able to identify mistakes in speech input, and provide users with more relevant feedback and recommendations.

SUMMARY OF INVENTION

The scope of protection is defined in the independent claims to which reference is now directed. Optional features are set out in the dependent claims.

According to an aspect of the present invention, there is provided a method of analysing an audio signal representing speech and providing feedback to a user. The method comprises: generating a phonetic sequence from text comprising words, the phonetic sequence comprising phonemes representing semantic components of the words of the text; receiving an input audio signal representing the text being spoken by a user; aligning the audio signal and the phonetic sequence in order to create a mapping between time windows in the audio signal and corresponding phonemes in the phonetic sequence; for a plurality of the time windows, comparing the received audio signal in the time window to an expected audio signal for the corresponding phoneme in the phoneme sequence using a predefined language model; and determining a score indicating a level of similarity between the received audio signal in the time window and the expected audio signal for the corresponding phoneme; identifying a feature of the user's speech as requiring improvement based on a plurality of scores determined for different instances of the same phoneme in the phoneme sequence; and providing feedback to the user based on the identified feature of the user's speech.

Taking into account a plurality of instances of the same phoneme when identifying mistakes in a user's speech helps address the above problems. For example, by only identifying mistakes based on multiple instances of the same phoneme, isolated mistakes by the user that do not represent habitual problems do not result in the provision of inappropriate feedback to the user. Similarly, the effects of false positives and false negatives which are inherent in speech models are reduced. Further, multiple instances of the same phoneme will generally only occur in continuous speech, and not in individual words or short phrases. By requiring users to speak for longer ('continuous speech'), users will speak more naturally and make mistakes typical of their actual speech. The features of the speech which are identified from the plurality of scores for are therefore representative of consistent and habitual mistakes which may, for example, have a significant impact on the intelligibility of the user's speech.

BRIEF DESCRIPTION OF THE DRAWINGS

The invention will now be further described by way of example only and with reference to the accompanying figures in which.

Like reference number are used for like elements throughout the description and figures.

DETAILED DESCRIPTION

Figure 1:
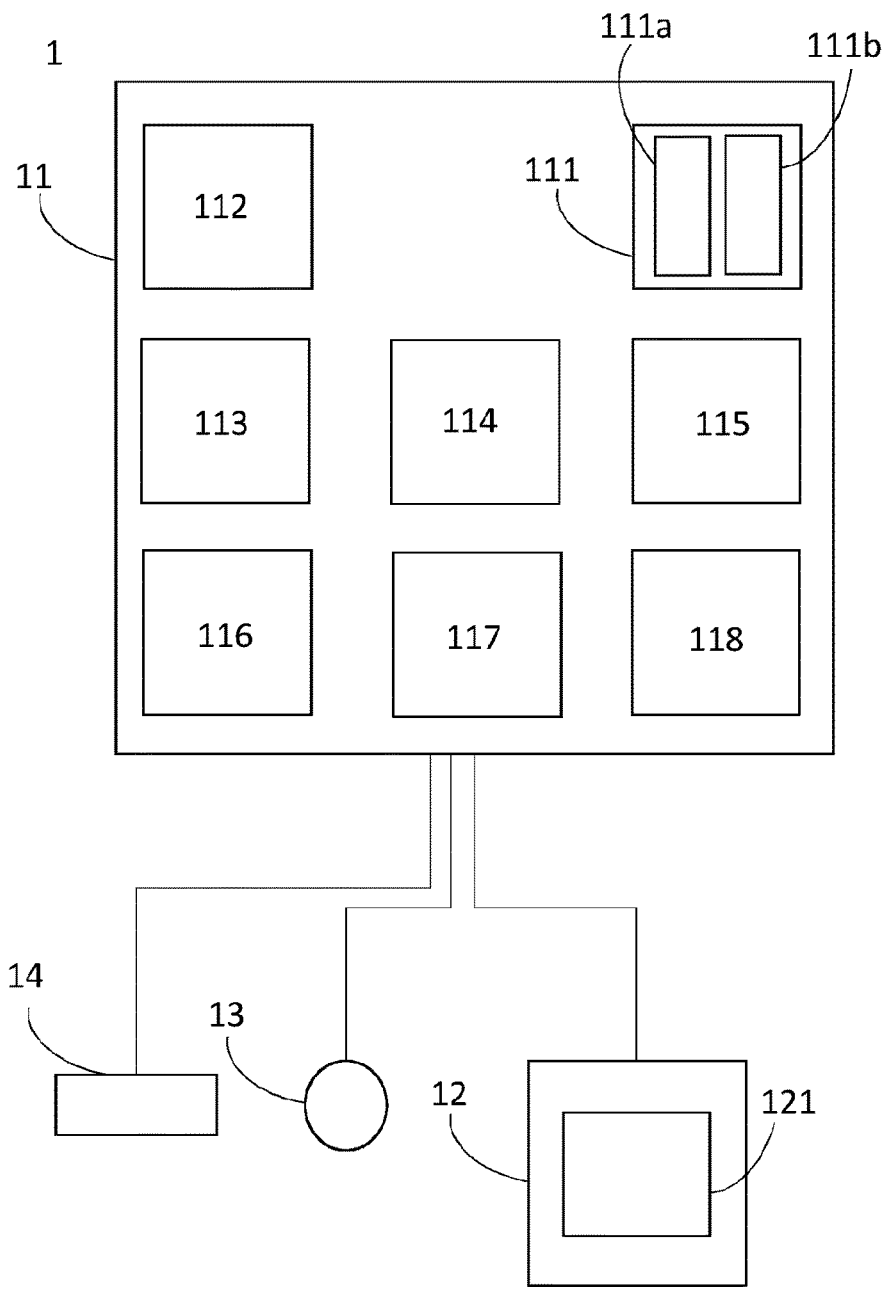
FIG. 1 is a schematic diagram illustrating a computer system for analysing speech and providing speech training to a user.

FIG. 1 illustrates an embodiment of a computer system 1 suitable for speech training according to the present invention. The computer system 1 preferably includes a computing device 11 having a processor and memory, a display 12 with an interface 121, a microphone 13 and a text input device 14.

In a first example of the invention, the computer system analyses audio data representing a user speaking words from a body of text and identifies occasions where the user mispronounces an expected phoneme. The expected phoneme can be identified if the computer system knows what text the user is reading from, and the system has either received or generated a phonetic sequence corresponding to that text for comparison, based on a predetermined or user-selected language model.

A beneficial aspect of examples of the invention is that the body of text the user is required to read is a long text, requiring the user to read continuously for a period of time, say between 30 seconds and a few minutes. By reading for this period of time, the user cannot hide any tendency they have to pronounce the words of the text either incorrectly or differently to the expected phonemes from the language model. In this way, the user's actual vocalisation of the text can be compared to the expected sounds, and a measure of the user's performance can be provided as feedback.

The user may select the body of text to read themselves, or may read a passage displayed on screen by the computer system. It is not necessary for the user to repeat a target vocalisation of the body of text that has been generated or output by the computer system as an example or model delivery. The aim for the user is not to develop the ability to repeat short set phrases, but at a basic level to speak naturally and intelligibly, and at higher level possibly to speak with a native speaker's accent.

Furthermore, the computer system need not analyse the audio input received from the user and convert this to text, as would occur in a typical text recognition system. This is because the system operates on the basis of comparing the similarity of the spoken sounds of the user with the expected phonemes for the body of text. A typical speech recognition system would use that similarity score to guess a phoneme and subsequently guess the word that the user had spoken. This requires contextual processing in advance of and behind a particular time point in the input audio data that is being processed in order to optimise the result of the guess and can be quite resource intensive. In examples of the invention, these steps are not necessary.

Instead, the raw similarity scores generated from the comparison of the user's spoken sound to an expected phoneme, are stored and retained in memory for analysis. As these scores are accumulated during the analysis of the audio of the user reading the text, the computer system can identify patterns where the user repeatedly mispronounces an expected phoneme. As will be explained later, such patterns may indicate that the speaker consistently mispronounces a particular phoneme, or that they only do so in a particular context, such as when the phoneme appears adjacent another particular phoneme in the sequence. As the computer system need only work with the similarity scores and the sequence of expected phonemes, it is computational efficient and can pass through the audio file considerably more quickly than speech recognition systems.

Further detail about an example implementation of the invention will now be described with reference to FIG. 1. The computing device may be a desktop computer, a laptop computer, a tablet computer, a personal digital assistant, a mobile telephone, a smartphone, an internet enabled television, an internet enabled television receiver, an internet enabled games console or portable games device. Furthermore, the microphone may be integrated into the computing device, such but not limited to as the microphone in a smart phone, or may be an externally connected peripheral device, such as but not limited to a microphone connected to a USB port of a computer or console. Although, in FIG. 1 the display 12 is illustrated as connected to the computing device, it will be appreciated that in embodiments it may also be integrated into the housing of the computing device. The text input device 14 may comprise any apparatus suitable for inputting text into the memory of the computing device keyboard, such as a keyboard, a mouse, or a USB port for accepting a USB memory device on which text is stored.

The memory of the computing device includes stored computer code implementing a number of data processing functions. As illustrated in FIG. 1, these functions include a text analyser 111, and phonetic dictionary 111a, an audio input receiver 112, an audio mapper 113, a comparator 114, a scorer 115, a pattern identifier 116, a pronunciation feature identifier 117, and a feedback module 118. These functions may be stored in a memory of the computing device and loaded into a real time memory of the processor for run time operation.

Although FIG. 1 illustrates a computer system comprising only a single computing device 11, examples of the invention also include implementations in which the computing device connects as a client to a server via a communication network. In this example, the data processing functions mentioned above may be stored and run at the server, and minimal data may be sent to and from the computing device 11. Examples of the invention may therefore include an application running on a portable computing device such as a smartphone or tablet computer, or a home personal computer, sending data to and receiving information from a server operating at a separate location. Alternatively, examples of the invention may involve downloading the executable program code, as well as a phonetic dictionary 111a and/or language model, for installing and running the above data processing functions in real time on a portable computing device such as a smartphone or tablet computer, or a home personal computer, for off-line operation without recourse to processing at a server.

In this context, the communications network may be any public, private, wired or wireless network. The communications network may include one or more of a local area network (LAN), a wide area network (WAN), the Internet, a mobile telephony communication system, or a satellite communication system. The communications network may comprise any suitable infrastructure, including copper cables, optical cables or fibres, routers, firewalls, switches, gateway computers and edge servers.

Examples of the invention may include an on-screen graphical user interface 121. The user interface may be provided, for example, in the form of a widget embedded in a web site, as an application for a device, or on a dedicated landing web page. Computer readable program instructions for implementing the graphical user interface may be stored on or downloaded to the computing device from a computer readable storage medium via a network, for example, the Internet, a local area network (LAN), a wide area network (WAN) and/or a wireless network. The instructions may be stored in a computer readable storage medium within the computing device. During operation, the graphical user interface is presented on the display 12 to provide instructions to a user of the speech recognition system. Specifically, the graphical user interface may provide instructions and an interface for a user to input text into the speech recognition system. This may be by either typing, cutting and pasting, or otherwise copying text into a dedicated input text-field in the graphical user interface, selecting text already displayed on screen using a mouse or other computer pointing device, or providing a mechanism for loading a file containing text into the computer memory. Loading a file into memory may for example be achieved by sending an email to an email client of the computing device or server, the email subsequently being analysed and text extracted, providing a link to a body of text at another location on a network, such as the Internet, or selecting and loading a file stored on a storage device connected to the computing device 11.

The data processing functions performed by the computer system illustrated in FIG. 1 will now be briefly described.

The computer system 1 includes a text analyser 111. The text analyser receives a body of text from the user and generates a representative sequence of phonemes.

The representative sequence of phonemes correspond to the body of text. The text analyser 111 uses a phonetic dictionary 111a to match letters or groups of letters from the body of text to corresponding phonemes. The text analyser 111 may also use a series of rules of pronunciation 111b to determine which phonemes from the phonetic dictionary 111a correspond to the letters of groups of letters from the body of text.

The computer system 1 also includes an audio input receiver 112. The audio input receiver module 112 receives an input audio signal of a user reading the body of text provided to the text analyser 111. The audio input receiver 112 may therefore be connected to the microphone 13 or the like, and be capable of transducing speech from the user into an input audio signal containing a recording of the user reading the body of text. Alternately, the audio input receiver may receive a recording of the user reading the text, without needing to access the microphone.

The computer system 1 also includes an audio-mapper 113. The audio mapper 113 identifies audio components in the input audio signal, and creates a mapping between the audio components and corresponding phonemes in the representative sequence of phonemes. It is to be understood that an audio component in the input audio signal is a section of the input signal that corresponds to a particular phoneme. In this context, the audio mapper 113 may process the input audio signal in real time as it is being received either from the microphone, or as a data stream across a network, or in an off-line mode, in which the recording of the user is completed and then sent to the audio mapper 113 for processing.

The audio mapper 113 provides an alignment between the input audio signal and the representative sequence of phonemes. The mapping between the audio components and corresponding phonemes in the representative sequence of phonemes includes timestamps for each phoneme which correspond to the time at which the phonemes are anticipated in the input audio signal.

The computer system 1 also includes a comparator 114. The comparator 114 compares each audio component in the input audio signal to an expected audio component. The expected audio component corresponds to a phoneme in the representative sequence of phonemes. The audio component in the input signal is compared to a specific expected audio component based on the mapping between the audio components of the input audio signal and the representative sequence of phonemes. The comparison between an audio component in the audio input signal and a corresponding expected audio component is performed using signal analysis techniques.

The computer system 1 also includes a scorer 115. The scorer 115 determines a score for each audio component of the input audio signal. This score indicates a level of similarity between the respective audio component in the input audio signal and the expected audio component for the corresponding phoneme in the representative sequence of phonemes.

The computer system 1 also includes a pattern identifier 116. The pattern identifier identifies a pattern of audio components from the audio input signal where the user's pronunciation (based on the audio component in the audio input signal) differs from the corresponding sound of the expected phoneme. This may be because the user is mispronouncing a particular phoneme. The pattern is identified using the scores for each audio component of the input audio signal, determined by the scorer 115, and the pattern may corresponds to a mispronounced phoneme that is mispronounced repeatedly.

The computer system 1 also includes a mispronunciation feature identifier 117. The mispronunciation feature identifier 117 identifies a feature of the user's speech that requires direction to more accurately pronounce a particular phoneme. The particular phoneme is a phoneme corresponding to the plurality of audio components from which a pattern of mispronunciation is identified. The mispronunciation feature identifier 117 therefore identifies a feature of the user's speech that requires further direction or correction based on the pattern identified by pattern identifier 116.

The computer system 1 also includes a feedback module 118, which provides feedback to the user based on the identified feature of the user's speech which requires direction, identified by the mispronunciation feature identifier 117. The feedback provided to the user aims to improve their speech according to the feature of the user's speech that requires direction. Operation of the feedback module may cause the display 12 of the computer system to present a textual or graphical indication of sounds or phonemes that were identified as mispronounced, as well as additional exercises for practicing pronouncing such phonemes correctly. This aspect of the example speech training system will be discussed in more in more detail below.

Each of the data processing functions described above may be implemented as computer readable program instructions stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

Alternatively, exemplary embodiments of the invention may be implemented as circuit board which may include a CPU, a bus, RAM, flash memory, one or more ports for operation of connected I/O apparatus such as printers, display, keypads, sensors and cameras, ROM, a communications sub-system such as a modem, and communications media.

In alternative embodiments, it is to be understood that each of the text analyser 111, the audio input receiver 112, the audio mapper 113, the comparator 114, the scorer 115, the pattern identifier 116, the mispronunciation feature identifier 117 and the feedback module 118 may be implemented by one or more processors. Each of these features may include memory for storing and reading data.

The operation of examples of the invention will now be described with reference to one or more flow charts. The flowcharts are intended to illustrate the operation of an example implementation of systems, methods, and computer program products according to various embodiments of the present invention. As discussed in connection, with FIG. 1, each block in the flowchart or block diagrams may represent a separate module comprising one or more executable computer instructions, or a portion of an instruction, for implementing the logical function specified in the block. The order of blocks in the diagram is only intended to be illustrative of the example. In alternative implementations, the logical functions illustrated in particular blocks may occur out of the order noted in the figures. For example, two blocks shown as adjacent one another may be carried out simultaneously or, depending on the functionality, in the reverse order. Each block in the flowchart may be implemented in software, hardware or a combination of software and hardware.

Figure 2:
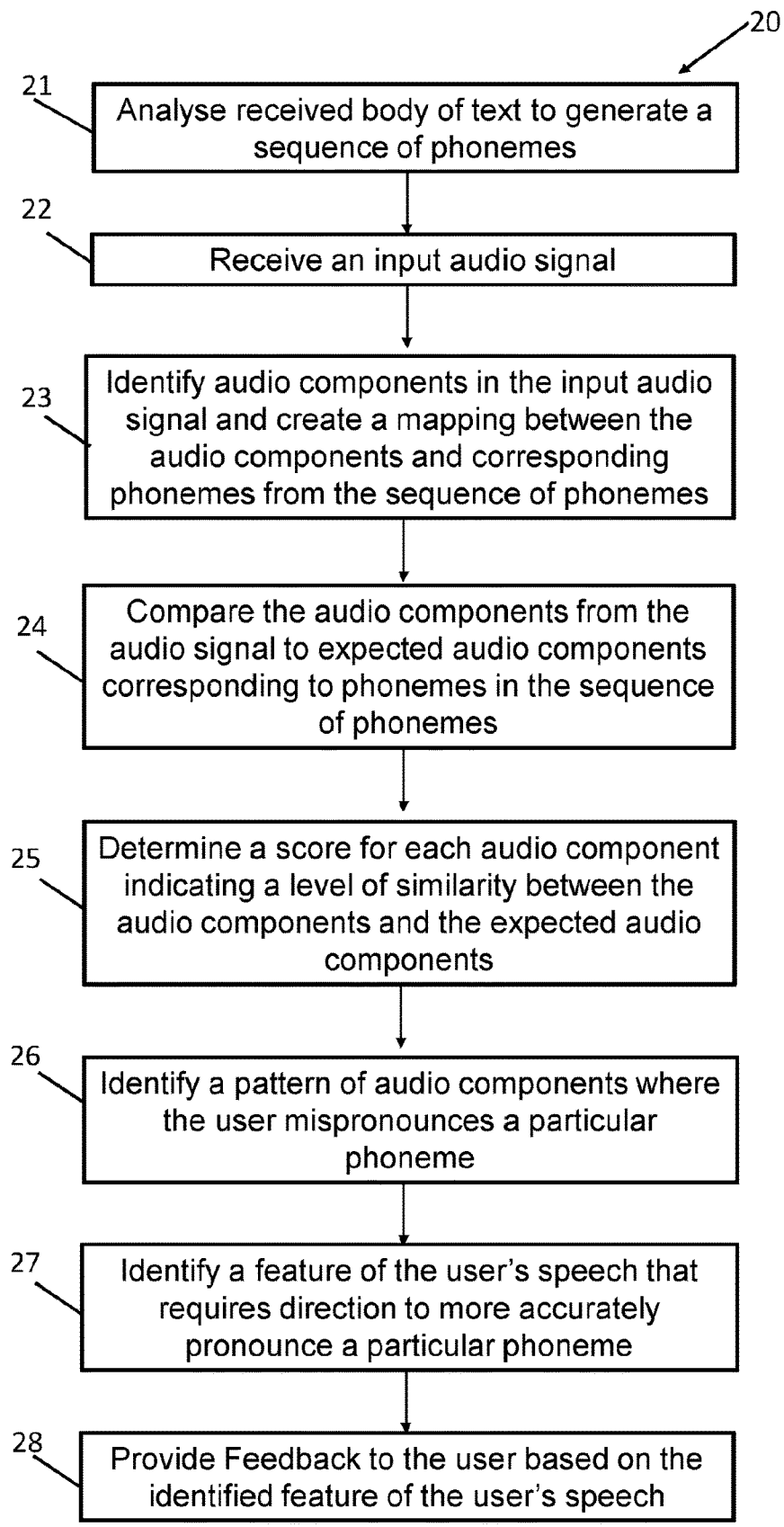
FIG. 2 is a flow diagram illustrating a method for analysing speech and providing speech training to a user.

FIG. 2 is a flow chart illustrating a computer implemented method of speech training 20 according to the present invention. The steps of the method are described below.

In step 21, a received body of text is analysed to generate a representative sequence of phonemes. The representative sequence of phonemes correspond to the body of text. Step 21 includes using a phonetic dictionary 111a to match letters or groups of letters from the body of text to corresponding phonemes. A series of rules of pronunciation 111b may also be used to determine which phonemes from the phonetic dictionary 111a correspond to the letters of groups of letters from the body of text.

In step 22, an input audio signal is received. The input audio signal includes a recording of a user reading the body of text. The input audio signal is transduced from a microphone or the like.

In step 23, audio components in the input audio signal are identified and a mapping between the audio components and corresponding phonemes in the representative sequence of phonemes is created. The mapping provides an alignment between the input audio signal and the representative sequence of phonemes. The mapping between the audio components and corresponding phonemes in the representative sequence of phonemes includes timestamps for each phoneme which correspond to the time at which the phonemes are anticipated in the input audio signal.

In step 24, each audio component in the input audio signal is compared to an expected audio component. The expected audio component corresponds to a phoneme in the representative sequence of phonemes. The audio component in the input signal is compared to a specific expected audio component based on the mapping between the audio components of the input audio signal and the representative sequence of phonemes. The comparison between an audio component in the audio input signal and a corresponding expected audio component is performed using signal analysis.

In step 25, a score for each audio component of the input audio signal is determined. This score indicates a level of similarity between the respective audio component in the input audio signal and the expected audio component for the corresponding phoneme in the representative sequence of phonemes.

In step 26, a pattern of audio components from the audio input signal where the user mispronounces a particular phoneme is identified. The pattern is identified using the scores for each audio component of the input audio signal from step 25. The pattern corresponds to a mispronounced phoneme that is mispronounced repeatedly.

In step 27, a feature of the user's speech that requires direction to more accurately pronounce a particular phoneme is identified. The particular phoneme is a phoneme corresponding to the audio components from which a pattern of mispronunciation is identified in step 26.

In step 28, feedback is provided to the user based on the identified feature of the user's speech which requires direction, identified in step 27. The feedback provided to the user aims to improve their speech according to the feature of the user's speech that requires direction.

It is to be understood that each of the steps 21 to 28 may be implemented by one or more processors. The one more processors may include memory for storing and reading data. Furthermore, each of the steps 21 to 28 may be implemented in a neural network architecture.

Each of the steps 21 to 28 are now discussed in more detail, and reference to alternative embodiments is given where necessary.

Figure 3:
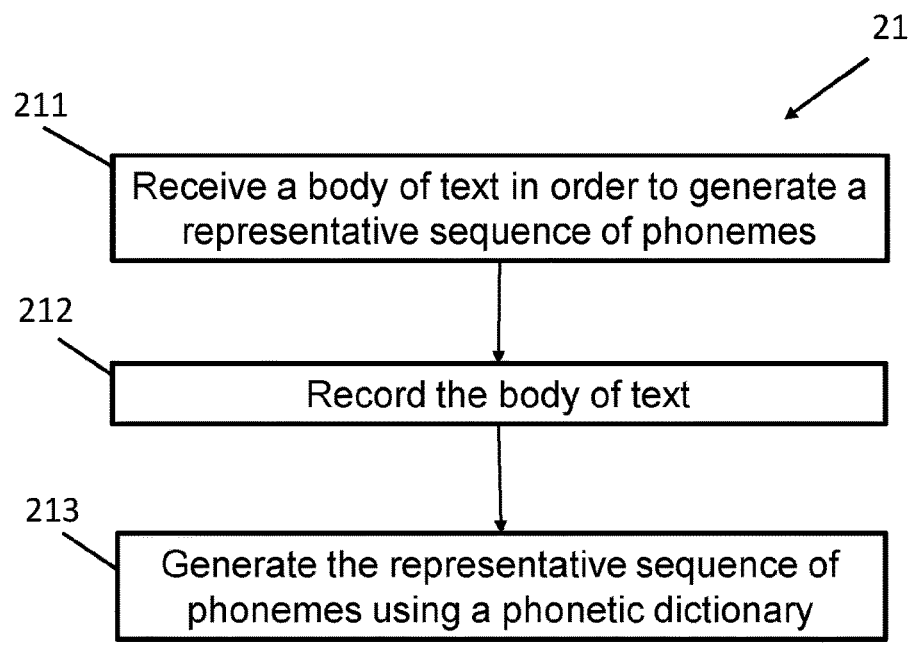
FIG. 3 is a flow diagram illustrating detail of a method step according to FIG. 2.

Firstly, step 21 from FIG. 2 will be discussed in more detail. FIG. 3 shows an expanded process of step 21.

In step 211, a body of text is received in order to generate a representative sequence of phonemes. The body of text is input by the user. Conventional methods of text input are used to input the body of text, such as typing, copying and pasting, or uploading via a flash drive or memory. Alternatively, the body of text is obtained over a network or the internet.

Preferably, an interface 121 is presented to the user for inputting the body of text. The interface 121 includes a data field for entering text, which is visible to the user. The interface 121 allows the user to enter large bodies of text of their choice.

The body of text is preferably large, meaning it contains multiple complete sentences of varying length and complexity. It is preferable that the body of text is large because the user is more likely to make mistakes when speaking a large body of text rather than a short piece of text or a predefined sentence or phrase. A user reading a large body of text is also more likely to make mistakes regarding particular phonemes in a regular or consistent way. By using a large body of text, these mistakes can be more easily identified.

In step 212, the body of text inputted by the user is recorded. It is to be understood that 'recorded' includes both waiting for the user to input the whole or a part of the body of text and then recording the whole or part of the body of text, or recording the body of text as a stream of text, and updating the recording in real-time.

In step 213, the representative sequence of phonemes is generated. The sequence of phonemes corresponds to the body of text. A phonetic dictionary is used to match letters or groups of letters from the body of text to corresponding phonemes. Different phonetic dictionaries may be used depending on the language of the inputted body of text. A series of rules of pronunciation may also be used to determine which phonemes from the phonetic dictionary correspond to the letters of groups of letters from the body of text.

The phonetic dictionary includes a list of phonemes that correspond to specific letters or sets of letters. The phonemes are matched with the body of text in the order of their correspondence to the body of text, to produce the representative sequence of phonemes. It is to be understood that the process of producing the sequence of phonemes may occur after input of the body of text has been wholly received or may occur in real-time as the user inputs the body of text and the body of text is received.

It is often the case that the inputted body of text includes letters, sets of letters or words that match to at least one allophone. Allophones are phonetically distinct variants of a phoneme. They have distinct sounds when spoken but, if substituted, do not change the meaning of a word or phrase. In this case, the sequence of phonemes generated by the in step 213 may include multiple allophones where necessary.

The generated sequence of phonemes can depend on a particular accent of a language. It is understood that different languages and accents include different phonemes. As such, the user may select what accent they wish to speak the input text in, and a phonetic dictionary and rules of pronunciation corresponding to that accent and language may be used. A plurality of phonetic dictionaries may be stored and used, and step 213 may generate multiple sequences of phonemes, each corresponding to a separate accent.

Furthermore, an additional phonetic dictionary may be used in the instance that the spelling of a word is not consistent with its phonetics. This often occurs with names. For example, the name 'Cholmondeley' is pronounced 'Chum-lee'. Similarly, the name 'Featherstonehaugh' is pronounced 'Fan-sure'. The additional phonetic dictionary converts spellings of words such as names into phonetically transparent spellings prior to the step of generating a sequence of phonemes with the phonetic dictionary and rules of pronunciation. This additional phonetic dictionary therefore prevents certain words such as names from being matched with phonemes that do not correspond to the actual pronunciation of the words.

It is to be understood that the phoneme sequence can be stored as a text file, audio file or any other file capable of storing the representative sequence of phonemes.

Step 22 from FIG. 2 is now described in more detail. Step 22 comprises receiving the input audio signal which includes a recording of the user reading the body of text. The input audio signal is preferably transduced by a microphone. The microphone detects sounds waves corresponding to the speech of the user and transduces them into the input audio signal. The input audio signal is then received in step 22.

The input audio signal may be recorded on a memory. Alternatively, the input audio signal may be processed in real-time as it is received in step 22.

Step 23 from FIG. 2 is now described in more detail.

In step 23, audio components in the input audio signal are identified and a mapping is created that maps the audio components to corresponding phonemes in the sequence of phonemes. In order to produce the mapping, signal processing techniques may be used to identify points in the input audio signal that correspond to phonemes in the sequence of phonemes. This may involve using data regarding the bandwidth, power, amplitude and frequency of the input audio signal, which relate to the frequency and amplitude of the user's speech.

A time window corresponding to an audio component of the input audio signal may be compared to different phonemes from the sequence of phonemes. The phoneme that corresponds most closely to the particular audio component may be mapped to that audio component accordingly. This process may repeat several times with consecutive audio components within the input audio signal to improve a confidence level that the sequence of phonemes has been mapped correctly to the input audio signal. For instance, if three consecutive audio components from the input audio signal map to three consecutive phonemes in the sequence of phonemes in the mapping, the confidence level that the mapping is correct is higher than if only one phoneme is mapped to an audio component. Once it is determined that the mapping is correct, or at least at an appropriate confidence level, each audio component is mapped to a corresponding phoneme from the sequence of phonemes, and each phoneme is assigned a time-stamp that corresponds to the point in the input audio signal at which the corresponding audio component is situated.

Alternatively, the mapping may be produced by estimating the time at which each phoneme in the sequence of phonemes corresponds to an audio component in the input audio signal. Time-stamps may then be assigned to each phoneme as above.

The mapping may include a portion or the entirety of the input audio signal. The mapping may therefore align the whole input audio signal to the sequence of phonemes.

Alternatively, the mapping may be created in real-time as the user speaks and as the input audio signal is received in a stream from step 22. In the case where the mapping is created in real-time, the mapping may be created for the most recent audio component or components in the input audio signal as it is received.

Figure 4:
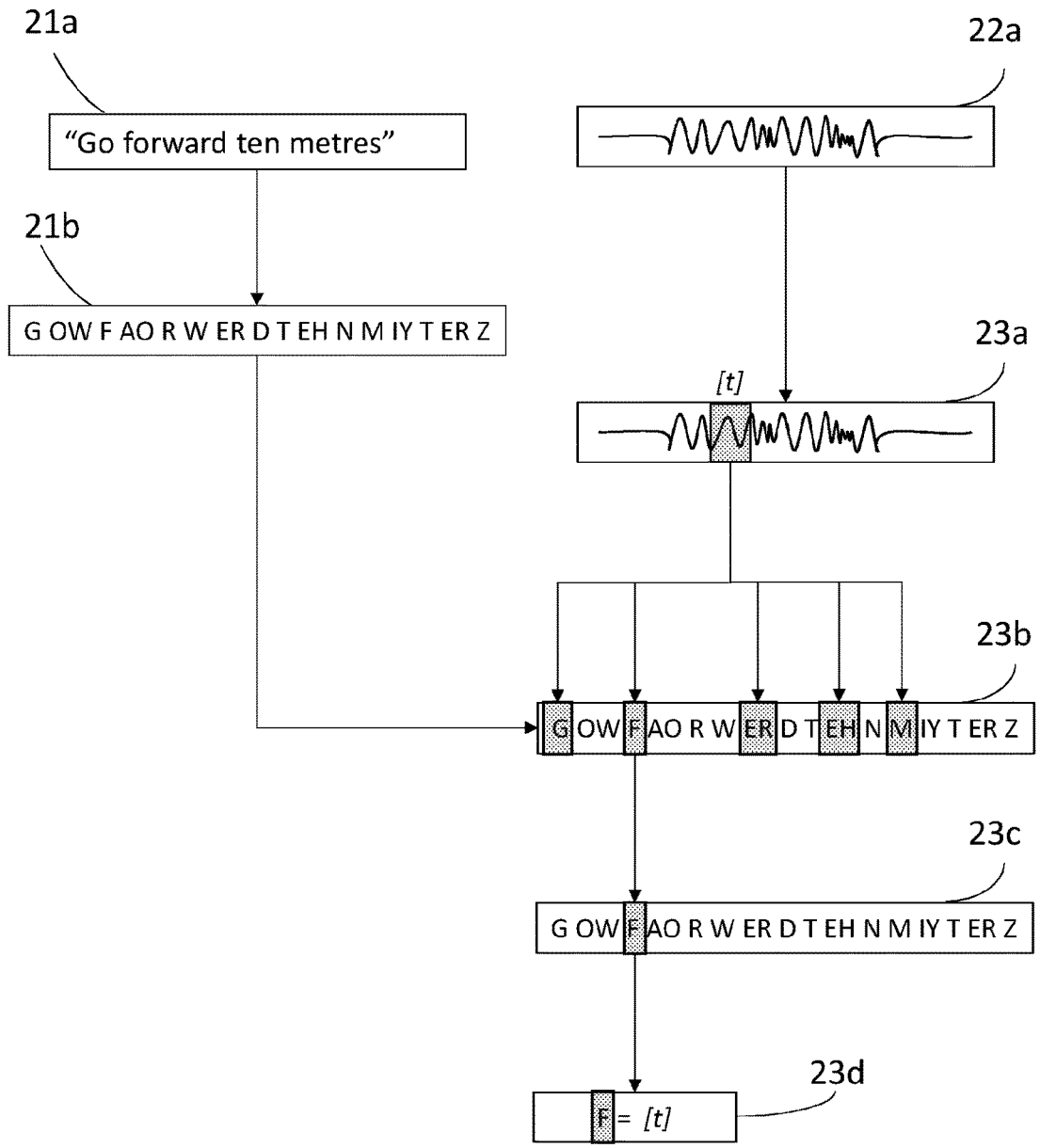
FIG. 4 is a flow diagram illustrating an example of the method according to FIG. 2.

FIG. 4 shows an example of a method 40, corresponding to steps 21 to 23 of the computer implemented method discussed above.

Step 21*a* and step 21*b* of FIG. 4 correspond to step 21 of FIG. 2. In step 21*a* of FIG. 4, the body of text is received in order to generate a representative sequence of phonemes. The body of text input by the user reads 'Go forward ten metres'. The body of text is recorded and used to generate the sequence of phonemes in step 21*b*. The sequence of phonemes are determined using a phonetic dictionary. In the example according to FIG. 4, the phonemes corresponding to the body of text include: 'G OW F AO R W ER D T EH N M IY T ER Z'.

Step 22*a* of FIG. 4 corresponds to step 22 of FIG. 2. In step 22*a*, an input audio signal is received. The input audio signal includes a recording of a user reading the body of text received in step 21*a*. The input audio signal is transduced from a microphone or the like.

Step 23*a*, 23*b*, 23*c* and 23*d* on FIG. 4 correspond to step 23 of FIG. 2. In step 23*a*, a time window corresponding to an audio component of the input audio is selected. The audio component in FIG. 4 has a time window denoted by time stamp 't', where t is a measure of time. It is to be understood that t may represent the start time of the time window containing the audio component, or may also include the length of the time window and/or the end time point.

In step 23*b*, the time window of the input audio signal including the audio component from step 23*a* is compared to different phonemes from the sequence of phonemes generated in step 21*b*. In FIG. 4, the phonemes G, F, ER, EH, and M are compared to the time window of the input audio signal including the audio component. It is to be understood that several other phonemes or all the phonemes from the sequence of phonemes may be compared to the time window of the input audio signal including the audio component, and that the phonemes selected in FIG. 4 are purely exemplary.

In step 23*c*, the phoneme from the sequence of phonemes that corresponds most closely to the time window of the input audio signal including the audio component is identified. In FIG. 4, this if the 'F' phoneme. It is to be understood that signal processing techniques may be used to identify which phoneme corresponds most closely to the time window of the input audio signal including the audio component. This may involve using data regarding the bandwidth, power, amplitude and frequency of the input audio signal, which relate to the frequency and amplitude of the user's speech.

In step 23*d*, the identified phoneme is mapped to that audio component accordingly. In FIG. 4, the 'F' phoneme is mapped to the time stamp t. This process may repeat several times with consecutive audio components, with each audio component being mapped to a corresponding phoneme from the sequence of phonemes, and each phoneme being assigned a time-stamp that corresponds to the point in the input audio signal at which the corresponding audio component is situated.

Figure 5:
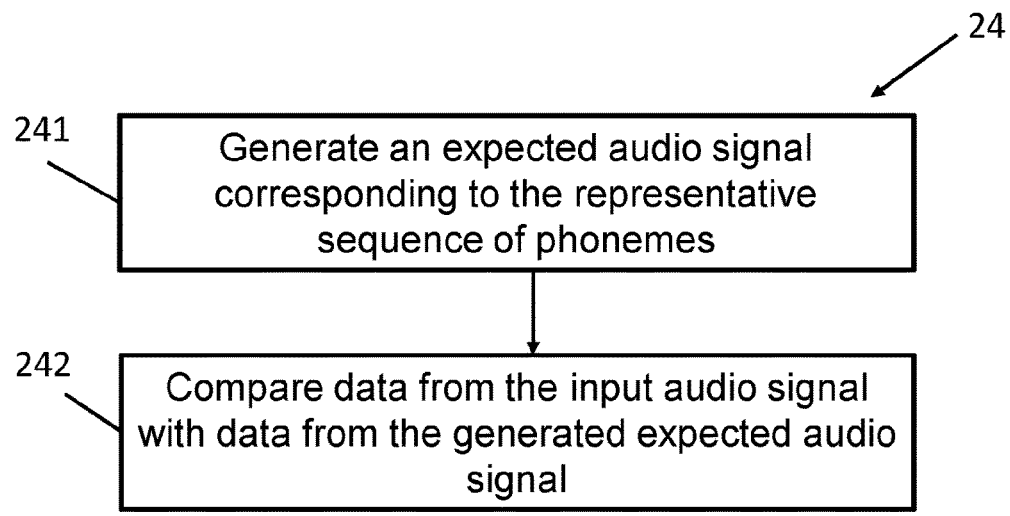
FIG. 5 is a flow diagram illustrating detail of a method step according to FIG. 2.

Step 24 is now described in more detail, with reference to FIG. 5. FIG. 5 shows an expanded process of step 24.

In step 241, an expected audio signal that corresponds to the representative sequence of phonemes is generated. Each phoneme in the sequence of phonemes is represented in the expected audio signal by an expected audio component. Each expected audio component is given a time-stamp corresponding to the time-stamp of the phoneme to which it corresponds.

As discussed above, it is to be understood that the expected audio signal can be generated in real-time as the mapping is generated in step 23. The expected audio signal may therefore only include expected audio components that correspond to the most recently received audio components from the input audio signal. Alternatively, the expected audio signal may include many expected audio components, corresponds to a portion or the entirety of the input audio signal.

In step 242, data from the input audio signal is compared with data from the generated expected audio signal. In particular, signal processing is performed on each audio component from the input audio signal and a specific corresponding expected audio component. The signal processing involves comparing parameters of each audio component and expected audio component. The parameters that are compared may include power, bandwidth, amplitude, frequency or any other audio signal parameter. The specific expected audio component that is compared with the audio component from the audio input signal is selected for comparison based on the time-stamps given to the expected audio components. The time stamp that corresponds to the particular point in time or time window in the audio input signal that is currently being compared is used to select the specific expected audio component for comparison. When the expected audio signal is compared with the input signal in real-time, it is to be understood that the point in time or time window in the audio input signal is at or is close to the present time.

For example, consider at a time of 0.35 s into the input audio signal, an audio component is being compared to a corresponding expected audio component with a time-stamp of 0.35 s. At this point, signal processing on the audio component and expected audio component is carried out. In this example, it is identified that the audio component has a frequency of 10.23 kHz and the expected audio component has a frequency of 10.71 kHz. These values may be used to calculate the difference of 0.48 kHz. More parameters as well as the frequency may then be compared in order to obtain more information.

In step 24, the audio component from the input audio signal may further be compared with different audio components from the expected audio signal, corresponding to different phonemes from the sequence of phonemes.

Furthermore, the audio component from the input signal may further be compared with audio components from a different sequence of phonemes, corresponding to a different accent.

Additionally, the audio component from the audio input signal may be compared with audio components that correspond to allophones of the phoneme to which the expected audio component corresponds. As discussed previously, the sequence of phonemes generated in step 21 may include multiple allophones where necessary. Hence, where allophones exist in the sequence of phonemes, step 24 compares the audio component from the input audio signal with both the expected audio component corresponding to the phoneme from the sequence of phonemes and the audio component corresponding to the allophone or allophones of the phoneme in the phoneme sequence.

This provides the benefit of being able to compare a single audio component from the input audio signal with multiple phonemes and allophones, which allows the process to identify more types of mispronunciations the user is making. The types of mispronunciation, and where this data is used, are discussed with reference to step 27.

Step 25 is now described in more detail.

In step 25, a score is determined for each audio component of the input audio signal. This score indicates a level of similarity between the respective audio component in the input audio signal and the expected audio component for the corresponding phoneme in the representative sequence of phonemes. The score is calculated using the comparison performed in step 24.

In particular, step 25 uses the comparison data produced by step 24 to determine a score of similarity between an audio component and a corresponding expected audio component. The score may be numerical, such as a decimal, percentage or a confidence rating. For instance, following on the above example, wherein the audio component has a frequency of 10.23 kHz and the expected audio component has a frequency of 10.71 kHz, step 25 may deduce that the score is equal to 10.23 divided by 10.71, giving a score of 0.955 or 95.5%. In this instance, a higher score means that the audio component and the expected audio component are more similar. Alternatively, step 25 may use the difference between the audio component and the expected audio component as a measure of score. Taking the above example, the difference is 0.48 kHz. Dividing 0.48 by 10.71 gives a score of 0.044 or 4.4%. In this instance, a lower score means that the audio component and the expected audio component are more similar.

If, as discussed above, step 24 has also compared a particular audio component from the input audio signal with multiple audio components from the expected audio signal, each corresponding to different phonemes, then multiple scores may be calculated for each audio component of the input audio signal in step 25. In this instance, each score represents the similarity between the audio component from the input audio signal and an audio component from the expected audio signal, corresponding to a phoneme from the sequence of phonemes.

Furthermore, scores for expected audio components corresponding to allophones may be calculated, and scores for audio components corresponding to phonemes from a different sequence of phonemes that relate to a different accent may be calculated. Therefore multiple scores may exist for each audio component of the input audio signal.

It is to be understood that step 25 can be performed in real-time alongside step 24. As a comparison is made in step 24, the score for that comparison can be generated in step 25.

Figure 6:
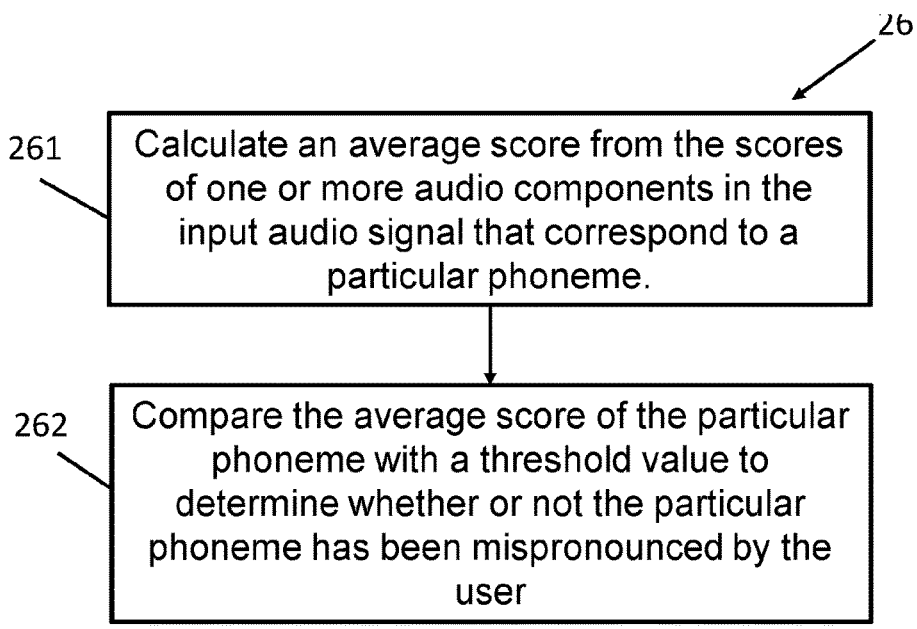
FIG. 6 is a flow diagram illustrating detail of a method step according to FIG. 2.

Step 26 is now be described in detail, with reference to FIG. 6.

In step 261, a pattern may be identified where the user mispronounces a particular phoneme by calculating an average score from the scores of one or more audio components in the input audio signal that correspond to the particular phoneme.

The identified patterns represent a series of instances where the particular phoneme has been mispronounced in a certain way. Step 26 therefore focuses on identifying mispronunciations that the user is making on a regular or consistent basis.

In step 262, the average score corresponding to the particular phoneme is compared with a threshold value. The threshold value may be a global threshold value against which all average scores for each phoneme in the sequence of phonemes are compared, or the threshold value may be specific to the particular phoneme.

As an alternative to having multiple thresholds specific to each particular phoneme, a scaling factor may be used to scale the average score of a particular phoneme. The benefit of using either multiple thresholds specific to each particular phoneme or a scaling factor is that the perceived importance of some phonemes over others can be reflected in the process. For instance, vowel sounds are often more important in determining the meaning of a word. Therefore, phonemes that correspond to vowel sounds within the sequence of phonemes may be given harsher specific thresholds or have their average scores scaled towards the global threshold.

The average score corresponding to the particular phoneme is compared with the threshold value to determine whether or not the particular phoneme has been, on average, mispronounced by the user.

As an alternative to using global or specific thresholds, the average score corresponding to the particular phoneme is compared with average scores corresponding to different phonemes in sequence of phonemes. The average scores may be compared by ranking them in order. One or more phonemes from the sequence of phonemes that correspond to one or more of the worst average scores may then be determined to be mispronounced by the user.

Preferably, patterns are identified by considering average scores over a large time window. The time window may be within the range of thirty seconds to several minutes or hours, or otherwise up to the total time for which the body of text is read by the user. Identifying patterns over a large time window has the advantage that anomalous scores for specific audio components are less important as they are smoothed out over multiple repetitions of the audio component. Thus the large time window makes the process of identifying patterns more reliable. Furthermore, using a large time window allows step 26 to identify what particular phonemes the user is mispronouncing consistently and what particular phonemes the user mispronounces the most. Thus, step 26 may include ranking the user's mispronunciations in order of the most regularly occurring.

Step 27 is now described in more detail.

If step 26 determines that a particular phoneme has been mispronounced by the user, step 27 identifies the type of the mispronunciation, and thus identifies a feature of the user's speech that requires direction to more accurately pronounce a particular phoneme.

The type of mispronunciation made by the user for a particular phoneme may be identified using several techniques. These techniques may include using pattern recognition algorithms, such as linear discriminant analysis, naïve Bayes classifiers, support vector machines, clustering algorithms or the like. Preferably, step 27 is performed in a neural network architecture.

The types of mispronunciation that are identified in step 27 are discussed here. Firstly, step 27 may identify a mispronunciation of a particular phoneme with regard to the context of the particular phonemes and/or other phonemes. It is to be understood that context means the environment in the sequence of phonemes in which the particular phoneme is found. The context can therefore include several parameters or variables, including and not limited to at least one of: the position of the particular phoneme in a word, phrase or sentence of the inputted body of text; the position of other phonemes in relation to the particular phoneme; and the phonemes adjacent to the particular phoneme. Step 27 may involve using signal analysis and pattern recognition algorithms to identify any one or more of these parameters as being responsible for the mispronunciation of the particular phoneme.

Secondly, step 27 may identify a mispronunciation of the particular phoneme by substitution, which occurs when mispronunciation of the particular phoneme involves pronouncing the particular phoneme as a different phoneme.

Identifying a mispronunciation by substitution for a particular phoneme involves using data from step 25 regarding scores for different phenomes for the same audio component of the input audio signal. In other words, the average score for the particular phoneme is compared with scores for other phonemes for the same audio component that corresponds to the particular phoneme.

Step 27 may then use pattern recognition algorithms or signal processing to identify that the particular phoneme is being mispronounced as another phoneme on a consistent basis, by determining that a score for a different phoneme is higher or better for the audio component than the average score for the particular phoneme to which the audio component corresponds.

This is useful if the person speaking the body of text pronounces the body of text corresponding to the particular phoneme as a different phoneme. A common example of this is the substitution of an 'r' sound with a 'w' sound.

Thirdly, step 27 may identify a mispronunciation of the particular phoneme by character, which occurs when mispronunciation of the particular phoneme involves pronouncing the particular phoneme in a way that is characteristic of a certain accent. This type of mispronunciation is identified by comparing the average score for the particular phoneme with the scores of corresponding phonemes from different sequences of phonemes related to different accents.

Pattern recognition algorithms or signal processing may be used to identify that the particular phoneme is being mispronounced as a phoneme or allophone corresponding to a different accent on a consistent basis, by determining that a score for a phoneme corresponding to a different accent is higher or better for the audio component than the average score for the particular phoneme.

For example, when training to speak in standard English, the user may pronounce the sound 'h' in a characteristically Russian way. Step 27 identifies this by comparing the average score for the phoneme corresponding to the sound 'h' from the sequence of phonemes relating to standard English with a corresponding phoneme from the sequence of phonemes related to a Russian accent. The average score for the phoneme from the sequence of phonemes related to the Russian accent is higher or better than the average score for the phoneme from the sequence of phonemes relating to a standard English accent. Thus, step 27 identifies that the user is making a mispronunciation by character.

Other types of mispronunciation that step 27 may identify include omissions, insertions, making unanalysable sounds, stress, pauses, pitch, and replacing multiple phonemes with a single phoneme or vice versa. Omissions occur when the user does not pronounce a sound corresponding to a particular phoneme within the sequence of phonemes. Insertions occur when the user pronounces additional sounds to those expected from the sequence of phonemes. The user makes unanalysable sounds when the sound pronounced by the user does not match any phoneme or allophone in the sequence of expected phonemes, or in the phonetic dictionary. The user replaces multiple phonemes with a single phoneme when the user pronounces a sound corresponding to a phoneme, but where multiple phonemes are expected from the sequence of phonemes. All of these types of mispronunciation can be indentified using pattern recognition algorithms or signal processing and analysis, as discussed with regard to the other types of mispronunciation described above.

It is to be understood that a mispronunciation made by the user and identified in step 27 can include any combination of the above types of mispronunciation. The identified feature of the user's speech that requires direction to more accurately pronounce a particular phoneme relates directly to the user's mispronunciation of the particular phoneme. This type of mispronunciation identification, as described above and with reference to step 27, occurs with reference to a specific language model. In particular, when the sequence of phonemes is generated it is done so with reference to a particular phonetic dictionary and rules of pronunciation for a specific language. The input audio signal and its audio components are then compared to an expected audio signal based on the sequence of phonemes for that specific language. Hence, mispronunciations are identified according to deviations from what is expected according to the specific language model. For example, if the user exhibits a lisp when reading the body of text in English, step 27 may identify that the phoneme corresponding to the sound 'S' is being mispronounced by substitution as 'TH'. A mispronunciation of a "V" sound as an "F" sound, and vice-versa, may also be identified in this way, by detecting a similarity to other sounds in the existing language model Additionally, or alternatively, a trained language model containing mispronunciations may also be used. Thus, in order to identify, in the above example, that the user actually exhibits a lisp, a further method of identifying a mispronunciation made by the user according to step 27 may be to use a mispronunciation model containing audio data representing lisp patterns. The mispronunciation model may be used with our without the language model and may be language-specific. The mispronunciation model is formed from training data from several users of the mispronunciation model, each of which mispronounce certain letters, words or phrases. Instead of comparing and categorizing the mispronunciations as in step 27 with reference to the specific language model above, the mispronunciation model stores mispronunciations in their own right, with or without reference to a specific language model. The mispronunciations in the mispronunciation model are mapped to phonemes to which they commonly match with or are found adjacent to. The mispronunciations are recorded as types of non-acceptable allophones to the phonemes they are matched to in the mispronunciation model.

When step 27 identifies mispronunciations, step 27 then uses the mispronunciation model to identify a specific mispronunciation that corresponds to the detected allophone of the phoneme being compared from the sequence of phonemes and the input audio signal.

Types of mispronunciation that may be included in the mispronunciation model include phenomena such as lisps, pitch, pauses, stresses on certain letters or words and sentence rhythm, for example.

The advantage of using the mispronunciation model as well as or alternatively to the language model is that mispronunciations of the user can be identified even if they do not sound or identify as mispronunciations according to the language of the body of text. Going back to the example above, step 27 using the mispronunciation model can identify that a user with a lisp is exhibiting a lisp, as well as that the phoneme corresponding to an 'S' sound is being pronounced as a 'TH' sound.

A further advantage of the mispronunciation model is that it can be trained by a wide variety of users with lots of training data, such that previously unknown mispronunciations or rare mispronunciations can be discovered and input into the mispronunciation model for use in identifying future mispronunciations. This means the method is a lot more adaptable when compared to conventional speech training systems. Furthermore, more bespoke feedback can be provided to the user, and new tutorials and exercises can be created to reflect new mispronunciation discoveries.

Using the mispronunciation model also provides benefits in the process of identifying mispronunciations according to step 27, in that common mispronunciations from the mispronunciation model can be associated or linked to particular phonemes in the sequence of phonemes. In this way, a mispronunciation of a particular phoneme can be identified more efficiently and more quickly than when using conventional techniques, because the occurrence of a certain mispronunciation can be predicted from the common mispronunciations associated with the particular phoneme from the mispronunciation model. Each phoneme may correspond to a different set of common mispronunciations from the mispronunciation model.

Each identified feature of the user's speech that requires direction may be ranked according to consistency or extent. Consistency indicates how frequently the user is mispronouncing the phoneme to which the identified feature of the user's speech that requires direction corresponds. Extent is a measure of the difference between the input audio signal and the expected audio signal, and is described by the average score of a particular phoneme. In particular, worse average scores for a particular phoneme are ranked as having a difference of greater extent than better average scores.

Figure 7:
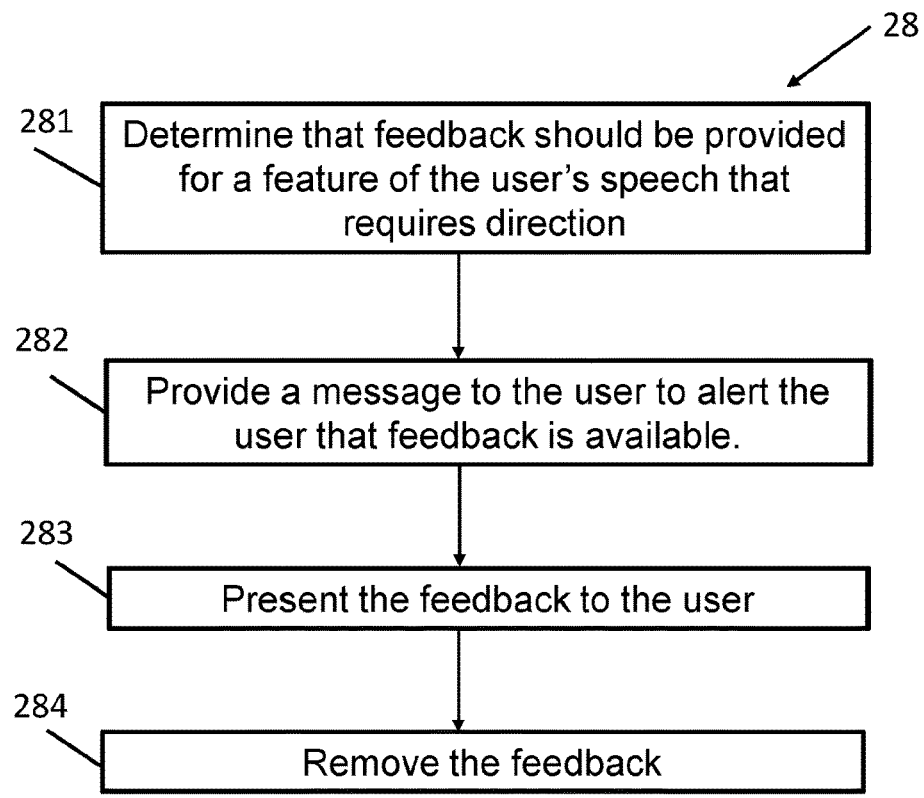
FIG. 7 is a flow diagram illustrating detail of a method step according to FIG. 2.

Step 28 is now described in detail, with reference to FIG. 7, which shows an expanded process of step 28. In step 28, feedback is provided to the user based on the feature of the user's speech that requires direction, as identified in step 27. The feedback is specific to the feature of the user's speech that requires direction and as such depends on the mispronunciation made by the user.

In step 281, it is determined that feedback should be provided for a feature of the user's speech that requires direction. This step involves selecting a feature of the user's speech that requires direction from those identified in step 27.

There may be several different features of the user's speech that require direction. In this case, each of the features of the user's speech that require direction that have been identified in step 27 are ranked in a feature list. The feature list is preferably ranked according to the frequency of occurrence of the mispronunciation corresponding to each feature in the feature list. In other words, the features which correspond to common mispronunciations are ranked higher or more importantly than features which correspond to rare mispronunciations.

Alternatively, the feature list may be ranked according to the extent of the mispronunciation corresponding to each feature in the feature list. It is to be understood that the extent of the mispronunciation is measured by considering the average score of a particular phoneme. Phonemes with worse average scores are mispronounced to a greater extent than phonemes with better average scores. Thus, the features in the feature list corresponding to the mispronunciations of phonemes that have the worst average scores are ranked higher or more importantly on the feature list than features which correspond to mispronunciations of phonemes with better average scores.

Several other ways of ranking the feature list are envisaged. The ranking may be adaptable depending on the type of mispronunciation the user or the process would like to focus on. In particular, the ranking of the feature list may depend on a specific goal set by the user. For example, the goal may be to for the user to be universally comprehensible. The feature list will then rank the features of the user's speech that require direction according to which features are most important in order to achieve the specific goal. In other words, the feature list may be ranked according to a priority rule, wherein the priority rule depends on a goal of the user.

In step 281, a feature of the user's speech that requires direction is selected from the feature list, according to the ranking of the feature list as described above.

In step 282, a message is provided to the user to alert the user that feedback is available. The message is preferably displayed as a box of text adjacent to, or overlapping with, the body of text which the user is reading. The message may include text such as "Stop reading, we have feedback for you" or the like. The user may then be required to interact with the message in order to obtain feedback.

In step 283, the feedback is presented to the user. The feedback includes an instruction aimed at stopping the user mispronouncing a particular phoneme according to the selected feature of the user's speech that requires direction. In other words, the feedback includes direction to the user.

The feedback provided in step 283 may include at least one of: the average score for the particular phoneme that corresponds to the mispronunciation of the feature selected for feedback; text relating to the instruction aimed at stopping the user mispronouncing the particular phoneme; a suggestion or link to an audio or video tutorial relating to the particular phoneme which the user has mispronounced; and a suggestion to do or a link to an exercise, the exercise relating to the particular phoneme which the user has mispronounced.

The feature selected for feedback may concern multiple phonemes. For instance, if the feature is determined to correspond to a mispronunciation by context, the particular phoneme and its adjacent phonemes may be included in the mispronunciation. In this case, step 283 may provide multiple feedback points. This may include multiple tutorials or exercises, each relating to a different phoneme for example.

In step 284, the provided feedback is removed and the user may continue to read and speak the body of text. The feedback may be removed after a fixed period of time has passed or once an improvement in the average score of the phoneme to which the feedback relates has been observed. In particular, the feedback may be updated in real-time such that improvements in the user's speech are reflected by the removal of feedback.

Alternatively, feedback may be removed once the user interacts with the feedback, to close the feedback, take a video or audio tutorial or do an exercise.

Step 28 may include further methods of providing feedback to the user. In particular, to ensure a newly acquired skill is practiced by the user, for instance, after a tutorial or exercise according to step 283, particular letters or sets of letters can be highlighted in the body of text to draw the attention of the user. The highlighted letters or sets of letters correspond to specific phonemes or groups of phonemes which the user initially had feedback for according to steps 281 to 283 above, and for which the user has practiced according to a tutorial or exercise.

Highlighting letters or sets of letters provides an advantage in that it draws the user's attention to letters or words that they should focus on pronouncing correctly. This prevents recidivism of mispronunciations and also has the benefit of drawing the attention of users who cannot read the body of text naturally or easily.

It is to be understood that feedback provided to the user as described in step 28 can occur continuously and in real-time as the user speaks the body of text. The advantage of this is that the user is provided with information regarding their pronunciation, and direction for improvement for certain features of their speech as soon as it has been analysed. There is no need to wait until the user has finished reading the body of text as is the case with traditional speech training methods, meaning the speech training method according to the present invention is more efficient.

As discussed previously, each of the steps 21 to 28 may be performed on one or more processors, or in a neural network architecture.

Additional features and alternative embodiments according to the present invention are now discussed.

Firstly, the process of identifying a feature of the user's speech that requires direction to more accurately pronounce a particular phoneme, as described by step 27 of FIG. 2, may further include the step of training and producing pronunciation profiles.

Pronunciation profiles map certain characteristics of the user's pronunciation of a particular phoneme without having to categorise mispronunciations into a specific type, such as by context, substitution, or character. In order to do this, multiple parameters concerning the pronunciation of the particular phoneme may be considered. These parameters include the average score for the particular phoneme for the audio component to which the particular phoneme corresponds, the average score of other phonemes for the audio component, the position of the particular phoneme within a word of the body of text, and the phonemes adjacent to the phoneme.

It is to be understood that the parameter of the average scores of other phonemes includes scores for allophones, phonemes from a different phonetic dictionary relating to a different accent and phonetically distinct phonemes from the same phonetic dictionary.

The benefit of training and producing pronunciation profiles is that a feature of the user's speech that requires direction to more accurately pronounce a particular phoneme can identified even if the mispronunciation is not common or within one of the categories of character, substitution or context. Thus, pronunciation profiles are used to identify mispronunciations that are divergent from the particular phoneme but that aren't necessarily categorised. Pronunciation profiles are therefore tailored to a user and can provide more detailed descriptions of the mispronunciation of the particular phoneme.

Pronunciation profiles can be trained over a learning period, wherein the user speaks the body of text and data from the input audio signal is collected.

Optionally, the computer implemented method according to FIG. 2 may further include a step of providing an assessment to the user.

The step of providing an assessment occurs after feedback is given to the user. In the step of providing assessment, a predefined second body of text is provided to the user, for the user to read. A second audio input signal corresponding to the speech of the user is then recorded, and played to a real native speaker of the language of the second body of text to transcribe. The real native speaker may input text on a terminal device. Once the real native speaker has finished transcribing the second audio input signal on the terminal device, the transcription is compared with the original second body of text. Using text recognition algorithms, a score is calculated to describe the similarity between the original second body of text and the transcription produced by the real native speaker. The score may be a percentage, decimal or the like. This score can then be provided as feedback to the original user.

The benefit of this assessment step is that it allows the user to gain exposure to real native speakers. It is often the case with conventional systems and methods that users learn a language in isolation. For instance, a person learning English in a non-native English speaking country may only be exposed to non-native teachers or learners, and so never encounter native speakers. Thus, the assessment step ensures that the user is provided with feedback obtained from interaction with a native speaker of the language they are learning.

Described above are a number of embodiments with various optional features. It should be appreciated that, with the exception of any mutually exclusive features, any combination of one or more of the optional features are possible.

The invention claimed is:

1. A computer-implemented method for analysing an audio signal representing speech of a user and for providing feedback to the user based on the speech, comprising:
   receiving a body of text;
   generating a representative sequence of phonemes based at least in part on the received body of text;
   receiving an input audio signal, the input audio signal including a recording of a user reading the body of text;
   identifying audio components in the input audio signal, and creating a mapping between the audio components and corresponding phonemes in the representative sequence of phonemes;
   generating an expected audio signal that corresponds to the representative sequence of phonemes;

based on the mapping, comparing respective audio components in the input audio signal to an expected audio component of the expected audio signal for a corresponding phoneme in the sequence of phonemes;

based on the comparison, determining a score for each audio component indicating a level of similarity between the respective audio component in the input audio signal and the expected audio component for the corresponding phoneme;

based on the respective scores for each audio component, identifying in the input audio signal a pattern of audio components where the user mispronounces a particular phoneme;

based on the identified mispronunciation of a particular phoneme, identifying a feature of the user's speech that requires direction to more accurately pronounce the particular phoneme; and providing feedback to the user based on the identified feature of the user's speech.

2. The computer-implemented method of claim 1, wherein analysing the received body of text and generating a representative sequence of phonemes comprises using a phonetic dictionary and/or rules of pronunciation for a language or accent of the body of the text.

3. The computer-implemented method of claim 1, wherein creating the mapping between audio components and corresponding phonemes in the representative sequence of phonemes comprises determining a plurality of timestamps, each timestamp being associated with a phoneme in the representative sequence of phonemes;
wherein the timestamp for a particular phoneme in the representative sequence of phonemes represents a point in time in the input audio signal at which an audio component is expected to align with its corresponding phoneme in the representative sequence of phonemes, the timestamp corresponding to a start time for a time window containing the audio component in the input audio signal.

4. The computer implemented method of claim 1, wherein identifying in the input audio signal a pattern of audio components where the user mispronounces the particular phoneme comprises:
calculating an average score from the scores for each audio component corresponding to the particular phoneme; and
determining, by reference of the average score either to a threshold value or to the average scores assigned to audio components corresponding to other phonemes, that the user mispronounces the particular phoneme.

5. The computer implemented method of claim 1, wherein identifying a feature of the user's speech that requires direction to more accurately pronounce the particular phoneme includes:
identifying the type of mispronunciation of the particular phoneme the user mispronounces, the type of mispronunciation including at least one of:
mispronunciation of the particular phoneme in a particular phoneme context, wherein a phoneme occurs in a particular phoneme context when it occurs in a particular position within a word and/or adjacent to another particular phoneme; and
mispronunciation of the particular phoneme by substitution, wherein mispronunciation of the particular phoneme involves pronouncing the particular phoneme as a different phoneme.

6. The computer implemented method of claim 1, wherein the expected audio component of the phonemes represents a particular accent of a language of the body of text.

7. The computer implemented method of claim 1, wherein providing feedback to the user based on the identified feature of the user's speech includes at least one of:
displaying a message to the user, the message informing the user of the identified feature of the user's speech;
providing the user with a video or audio tutorial, the video or audio tutorial relating to the identified feature of the user's speech; and
providing the user with an exercise, the exercise relating to the identified feature of the user's speech.

8. The computer implemented method of claim 1, wherein the body of text is input by the user.

9. The computer implemented method of claim 1, wherein the step of identifying audio components in the input audio signal, and creating a mapping is done in real or near to real-time as the input audio signal is received.

10. A non-transitory recording medium, readable by a computer and having recorded thereon a computer that, when executed by the computer, direct the computer to:
receive a body of text;
generate a representative sequence of phonemes based at least in part on the received body of text;
receive an input audio signal, the input audio signal including a recording of a user reading the body of text;
identify audio components in the input audio signal, and create a mapping between the audio components and corresponding phonemes in the representative sequence of phonemes;
generate an expected audio signal that corresponds to the representative sequence of phonemes;
based on the mapping, compare respective audio components in the input audio signal to an expected audio component of the expected audio signal for a corresponding phoneme in the sequence of phonemes;
based on the comparison, determine a score for each audio component indicating a level of similarity between the respective audio component in the input audio signal and the expected audio component for the corresponding phoneme;
based on the respective scores for each audio component, identify in the input audio signal a pattern of audio components where the user mispronounces a particular phoneme;
based on the identified mispronunciation of a particular phoneme, identify a feature of the user's speech that requires direction to more accurately pronounce the particular phoneme; and
provide feedback to the user based on the identified feature of the user's speech.

11. An apparatus for analysing an audio signal representing speech of a user and for providing feedback to the user based on the speech, the apparatus comprising:
a text-analyser configured to at least:
receive a body of text; and
generate a representative sequence of phonemes based at least in part on the received body of text;
an audio-input receiver configured to receive an input audio signal, the input audio signal including a recording of a user reading the body of text;
an audio-mapper configured to identify audio components in the input audio signal, and create a mapping between the audio components and corresponding phonemes in the representative sequence of phonemes;

a comparator configured to:
   generate an expected audio signal that corresponds to the representative sequence of phonemes, and
   based on the mapping, compare respective audio components in the input audio signal to an expected audio component of the expected audio signal for a corresponding phoneme in the sequence of phonemes;
a scorer configured to, based on the comparison, determine a score for each audio component indicating a level of similarity between the respective audio component in the input audio signal and the expected audio component for the corresponding phoneme;
a pattern identifier configured to, based on the respective scores for each audio component, identify in the input audio signal a pattern of audio components where the user mispronounces a particular phoneme;
a mispronunciation feature identifier configured to, based on the identified mispronunciation of a particular phoneme, identifying a feature of the user's speech that requires direction to more accurately pronounce the particular phoneme; and
a feedback module configured to provide feedback to the user based on the identified feature of the user's speech.

12. The apparatus of claim 11, wherein the text analyser analyses the received body of text and generates a representative sequence of phonemes using a phonetic dictionary and/or rules of pronunciation for a language or accent of the body of the text.

13. The apparatus of claim 11, wherein the audio-mapper creates the mapping between audio components and corresponding phonemes in the representative sequence of phonemes by determining a plurality of timestamps, each timestamp being associated with a phoneme in the representative sequence of phonemes;
   wherein the timestamp for a particular phoneme in the representative sequence of phonemes represents a point in time in the input audio signal at which an audio component is expected to align with its corresponding phoneme in the representative sequence of phonemes, the timestamp corresponding to a start time for a time window containing the audio component in the input audio signal.

14. The apparatus of claim 11, wherein the audio mapper identifies in the input audio signal a pattern of audio components where the user mispronounces the particular phoneme by:
   calculating an average score from the scores for each audio component corresponding to the particular phoneme; and
   determining, by reference of the average score either to a threshold value or to the average scores assigned to audio components corresponding to other phonemes, that the user mispronounces the particular phoneme.

15. The apparatus of claim 11, wherein the pattern identifier identifies a feature of the user's speech that requires direction to more accurately pronounce the particular phoneme by:
   identifying the type of mispronunciation of the particular phoneme the user mispronounces, the type of mispronunciation including at least one of:
   mispronunciation of the particular phoneme in a particular phoneme context, wherein a phoneme occurs in a particular phoneme context when it occurs in a particular position within a word and/or adjacent to another particular phoneme; and
   mispronunciation of the particular phoneme by substitution, wherein mispronunciation of the particular phoneme involves pronouncing the particular phoneme as a different phoneme.

16. The apparatus of claim 11, wherein the expected audio component of the phonemes represents a particular accent of a language of the body of text.

17. The apparatus of claim 11, wherein the feedback module provides feedback to the user based on the identified feature of the user's speech by at least one of:
   displaying a message to the user, the message informing the user of the identified feature of the user's speech;
   providing the user with a video or audio tutorial, the video or audio tutorial relating to the identified feature of the user's speech; and
   providing the user with an exercise, the exercise relating to the identified feature of the user's speech.

18. The apparatus of claim 11, wherein the body of text is input by the user.

19. The apparatus of claim 11, wherein the step of identifying audio components in the input audio signal, and creating a mapping is done in real or near to real-time as the input audio signal is received.

* * * * *